(12) United States Patent
Zhou et al.

(10) Patent No.: US 10,144,647 B2
(45) Date of Patent: Dec. 4, 2018

(54) ULTRATHIN CARBON NANOTUBE FILM AND PREPARATION METHOD AND APPARATUS THEREOF

(71) Applicant: INSTITUTE OF PHYSICS, CHINESE ACADEMY OF SCIENCES, Beijing (CN)

(72) Inventors: Weiya Zhou, Beijing (CN); Qiang Zhang, Beijing (CN); Yanchun Wang, Beijing (CN); Sishen Xie, Beijing (CN)

(73) Assignee: INSTITUTE OF PHYSICS, CHINESE ACADEMY OF SCIENCES, Beijing (CN)

( * ) Notice: Subject to any disclaimer, the term of this patent is extended or adjusted under 35 U.S.C. 154(b) by 49 days.

(21) Appl. No.: 14/889,753

(22) PCT Filed: Apr. 22, 2014

(86) PCT No.: PCT/CN2014/075908
§ 371 (c)(1),
(2) Date: Nov. 6, 2015

(87) PCT Pub. No.: WO2014/180249
PCT Pub. Date: Nov. 13, 2014

(65) Prior Publication Data
US 2016/0115030 A1 Apr. 28, 2016
US 2016/0347616 A2 Dec. 1, 2016

(30) Foreign Application Priority Data

May 7, 2013 (CN) .......................... 2013 1 0164499

(51) Int. Cl.
*C01B 32/16* (2017.01)
*C01B 31/02* (2006.01)
(Continued)

(52) U.S. Cl.
CPC .......... *C01B 31/0226* (2013.01); *C01B 32/16* (2017.08); *C01B 32/168* (2017.08);
(Continued)

(58) Field of Classification Search
None
See application file for complete search history.

(56) References Cited

U.S. PATENT DOCUMENTS

2005/0042162 A1\* 2/2005 Resasco ................ B01J 8/0055
423/447.3
2006/0104887 A1\* 5/2006 Fujioka ................. B82Y 30/00
423/447.3
(Continued)

FOREIGN PATENT DOCUMENTS

CN 101260595 A 9/2008
CN 1803594 A 10/2008
(Continued)

OTHER PUBLICATIONS

Merriam-Webster online dictionary; definition: making; downloaded Sep. 4, 2017.\*
Lieber et al.; Large-Area Blown Bubble Films of Aligned Nanowires and Carbon Nanotubes; Nature Technology; vol. 2, pp. 372-377; Jun. 2007.\*

*Primary Examiner* — Guinever S Gregorio
(74) *Attorney, Agent, or Firm* — Shay Glenn LLP (57) ABSTRACT

A method for preparing a carbon nanotube (CNT) film is provided, comprising: providing a growth chamber of CNTs, which includes an inlet end, an outlet end, and a first-level growth cavity and a second-level growth cavity, and the first-level growth cavity and the second-level growth cavity are in fluid communication between the inlet end and the outlet end; making precursor materials, which are used for forming CNTs, react in at least the first-level growth cavity of the growth chamber of CNTs to generate CNTs; and making a carrier gas flow into the growth chamber through the inlet end, and pass through the first-level growth cavity and the second-level growth cavity in sequence, wherein, a radial dimension of the first-level growth cavity in a flowing direction of the carrier gas is smaller than that of the second-level growth cavity at a junction between the first-level growth cavity and the second-level growth cavity, and (Continued)

a bubble blowing process is conducted with the precursor materials under the drive of the carrier gas at a position of an opening of the first-level growth cavity within the second-level growth cavity to generate a closed cylindrical CNT film partially disposed in the first-level growth cavity. The method of the present invention can prepare continuous, ultrathin and self-supported transparent conductive CNT film continuously and directly.

6 Claims, 7 Drawing Sheets

(51) Int. Cl.
  *D01F 9/133* (2006.01)
  *C01B 32/168* (2017.01)
(52) U.S. Cl.
  CPC .......... *D01F 9/133* (2013.01); *C01B 2202/02* (2013.01); *C01B 2202/04* (2013.01); *C01B 2202/06* (2013.01); *C01B 2202/22* (2013.01)

(56) References Cited

U.S. PATENT DOCUMENTS

2010/0290979 A1* 11/2010 Ackermann ............... B01J 3/08
  423/447.1
2014/0010749 A1* 1/2014 Nakamura ............. D01G 13/00
  423/447.1
2015/0059571 A1* 3/2015 Denton .................. B82Y 30/00
  95/28

FOREIGN PATENT DOCUMENTS

| | | |
|---|---|---|
| CN | 101613895 A | 12/2009 |
| JP | 2004292310 A | 10/2004 |

* cited by examiner

ULTRATHIN CARBON NANOTUBE FILM AND PREPARATION METHOD AND APPARATUS THEREOF

TECHNICAL FIELD

The present invention relates to an ultrathin carbon nanotube film and a preparation method and an apparatus thereof. More particularly, it relates to a continuous, self-supported and transparent conductive carbon nanotube film and a preparation method and an apparatus thereof.

BACKGROUND

A carbon nanotube (CNT) is a material with excellent and unique properties of optics, electricity and mechanics. It's electron conducting capability is high in the axial direction while being suppressed in the radial direction. It has not distinct characteristic absorption for visible light and near IR. These characters enable a film structure formed from CNTs or CNT bundles (be referred to as a CNT film) to exhibit both transparent and conducting capabilities. Moreover, since a CNT film exhibits a good flexibility, and its conducting capability is less affected by a certain degree of bending and folding, it would be an ideal material for a flexible transparent conducting film to replace ITO, which can be widely applied to flexible electronic devices as flexible transparent electrode, for example, light emitting diode (LED), organic light emitting diode (OLED), solar cell, field emission, liquid crystal display and other fields.

However, the thickness of a CNT film should be under 100 nm generally for possessing sufficient light transmittance (about 70% for wavelength of 550 nm).

So far, a post-deposition method is a major way of preparing a flexible transparent conductive carbon nanotube film widely reported at home and abroad, such as solution spraying method, filter and transfer method, spin coating method, pulling method, electro-deposition method, and the likes. The post-deposition method includes three steps: 1) purification of CNTs, 2) dispersion of CNTs, and 3) deposition of a CNT film. However, the post-deposition method is complex in process and products obtained with this method must be attached to a substrate. Furthermore, such method involves a chemical modification procedure, the influence to the electrical property of the CNT film of which cannot be determined. In particular, it is difficult to prepare a continuous, pure and self-supported flexible transparent conducting CNT film by the post-deposition method.

Preparation methods for a flexible transparent conductive CNT film with a direct or an indirect non-chemical modification procedure have always been explored for avoiding the influence of chemical modifications to CNT films. However, the thickness of a CNT film grown directly must be larger than 100 nm due to the constraints of its preparation conditions, since it is impossible to completely remove a film thinner than 100 nm from the wall of a growth chamber; the area of a CNT film is also limited by the growth chamber, being about 100 $cm^2$, and the film still can't be prepared continuously, which certainly restrict the scale and further application of CNT films prepared directly. Therefore, it is one of the important challenges for researchers in the art to prepare a continuous, ultrathin and self-supported transparent conductive CNT film and promote the scale production thereof and its wide applications in flexible transparent electronic devices.

In recent years, various methods for generating continuous CNT filaments and films have been developed, but the continuous direct preparation of ultrathin (less than 100 nm in thickness) and self-supported transparent conductive CNT films has not been found yet, which hinders the development and industrialization of CNTs. How to realize the continuous direct preparation of ultrathin and self-supported transparent conductive CNT films becomes a key problem urgently to be solved in order to expand applications of CNTs. Furthermore, the prior technology for directly preparing continuous CNT filaments and films mainly employs a catalytic pyrolysis method, in which the growth chamber needs to be sealed except for an air inlet and an air outlet, therefore, it has disadvantages of high cost, not being suitable for collecting CNT films on a large scale, and needing a complex experimental facility.

SUMMARY OF INVENTION

In view of the foregoing, an object of the present invention is to provide a method and an apparatus for continuously preparing an ultrathin CNT film, so as to prepare a continuous, ultrathin and self-supported transparent conductive CNT film, and the apparatus is simple in structure and can continuously collect CNT films in large scale with no need to be sealed.

The present invention provides a method for preparing a CNT film, comprising:

providing a growth chamber of CNTs, which includes an inlet end, an outlet end, and at least a first-level growth cavity and a second-level growth cavity that are in fluid communication between the inlet end and the outlet end;

making precursor materials, which are used for forming CNTs, react in at least the first-level growth cavity of the growth chamber of CNTs to generate CNTs;

making a carrier gas flow into the growth chamber through the inlet end, and pass through the first-level growth cavity and the second-level growth cavity in sequence, wherein, a radial dimension of the first-level growth cavity in a flowing direction of the carrier gas is smaller than that of the second-level growth cavity at a junction between the first-level growth cavity and the second-level growth cavity, and a bubble blowing process is conducted with the precursor materials under the drive of the carrier gas to generate a closed cylindrical CNT film partially disposed in the first-level growth cavity at a position of an opening of the first-level growth cavity within the second-level growth cavity;

collecting the CNT film continuously at the outlet end of the growth chamber.

According to the method of the present invention, the first-level growth cavities (3a) includes multiple growth cavities, with their openings being placed within the same second-level growth cavity (14).

According to the method of the present invention, the growth chamber further comprise third-level to Nth-level growth cavities, wherein, N>3, and the average radial dimensions of the growth cavities in the flowing direction of the carrier gas increase successively from the first-level growth cavity to the Nth-level growth cavity.

According to the method of the present invention, wherein, the first-level growth cavity to the Nth-level growth cavity are all tubular with different diameter each other, and the first-level to the Nth-level growth cavities are in fluid communication to each other for forming a step-tubular growth chamber.

According to the method of the present invention, wherein, at least one of the first-level to the Nth-level growth cavities is tapered tube.

According to the method of the present invention, wherein, the first-level growth cavity and the second-level growth cavity are tubes with different radial dimensions, and one end of the first-level growth cavity extends into the second-level growth cavity in a flowing direction of the carrier gas, and the carrier gas passes through at least part of the first-level growth cavity and the second-level growth cavity while flowing through the growth chamber.

According to the method of the present invention, wherein, the precursor materials for forming the CNTs include catalyzers and carbon sources.

The present invention further provides a CNT film which is prepared with the methods above.

The present invention further provides a continuous, self-supported and transparent conductive CNT film formed from single-walled, double-walled or multi-walled CNTs and nanotube bundles with a length of several hundred microns to centimeters and a purity of more than 90 wt. %, wherein, the CNTs and nanotube bundles within the film are in the form of continuous web with two-dimensional disordered distribution, the porosity is 20%-60%, the thickness is at least 1 nm, and the growth rate is at least 10 m/h.

The present invention further provides a method for preparing a CNT fiber, comprising:

producing a CNT film with the method above;

immersing the CNT films collected continuously at the outlet end of the growth chamber into a coagulant, and making the CNT film shrink sharply to form a continuous CNT fiber.

The present invention further provides a CNT fiber prepared with the method above.

The present invention further provides an apparatus for preparing a CNT film, comprising:

a growth chamber of CNTs, which includes an inlet end, an outlet end, and at least a first-level growth cavity and a second-level growth cavity that are in fluid communication between the inlet end and the outlet end, wherein, the carrier gas flows into the growth chamber through the inlet end, and at least part of the carrier gas passes through the first-level growth cavity and the second-level growth cavity in sequence; the temperature at a position, which is at an opening of the first-level growth cavity within the second-level growth cavity, is suitable for the growth of the CNTs, and a radial dimension of the first-level growth cavity in a flowing direction of the carrier gas is smaller than that of the second-level growth cavity at a junction of the first-level growth cavity and the second-level growth cavity.

According to the apparatus provided in the present invention, the first-level growth cavities (3a) includes multiple growth cavities, with their openings being placed within the same second-level growth cavity (14).

According to the apparatus provided in the present invention, the growth chamber further comprises third-level to Nth-level growth cavities, wherein, N>3, and the average radial dimensions of the growth cavities increase successively from the first-level growth cavity to the Nth-level growth cavity.

The methods of the present invention have the following advantages: simple, easy to operate, high degree of safety, the shape and property of products being controllable, high production rate, low cost, easy to scale, being able to continuously and directly prepare continuous, ultrathin and self-supported transparent conductive CNT film, and being able to prepare continuous, ultrathin and self-supported CNT fiber further.

In one method of the present invention, the carbon source, catalyzer and adjuvant can be mixed well before entering into the growth chamber, and input into the inner tube of the growth chamber in the form of gas or liquid with the carrier gas, wherein, the gas stream is supplied continuously at steady rate. Less catalyzer and adjuvant enter into the reaction chamber due to their sublimation, which has the followings advantageous: being beneficial to form small and stable catalytic particles, and being beneficial to obtain ultrathin, self-supported and transparent conductive CNT films.

The structure of the apparatus of the present invention is simple and optimized, which adopts a principle similar to "bubble blowing" to generate a self-supported and transparent conductive CNT tubular film with the width of the film being controlled through the design of the growth cavity and the controlled gas stream rate, so that a self-supported continuous film with a large width can be created.

In the preparation methods of the present invention, the growth chamber of CNTs can be placed in any directions, for example, horizontally, aslant, and vertically; and preferably, the opening of the growth chamber can be directly positioned at the atmosphere with no need to be sealed, which has advantageous of the continuous collection of the CNT film.

The CNT films of the present invention are formed from single-walled, double-walled or multi-walled CNTs and nanotube bundles with a length of several hundred microns to centimeters and a purity of more than 90 wt. %; the CNTs and nanotube bundles within the film are in the form of continuous web with two-dimensional disordered distribution, having a good uniformity and a certain orientation along the length, and the porosity of the web is generally 20%-60%; the ultrathin CNT film is self-supported and independent and has no substrate; the mechanical strain strength of the film is up to 350 MPa and the Young's modulus is up to 5 GPa; the thickness of the film is 1 nm at least, that is the thickness of the web of monolayer and single-walled CNTs, and the film is transparent; the length of the film is not limited, which can continuously grow and can be regulated; the growth rate is controllable, up to several hundreds of meters per hour, generally 50-500 m/h; and the width of the film is adjustable in the range of 1 cm-1 m.

The ultrathin CNT film may be adjustable in length and grow continuously and directly with the continuous supply of raw materials, wherein, the growth rate is controllable, generally 50-500 m/h; the ultrathin CNT film is also adjustable in width, which can be regulated by employing a multiple-tube "bubble blowing" process according to the actual requirements with the settings of growth process conditions, up to above 1 m; the thickness of the ultrathin CNT film is uniform and adjustable depending on the design of growth parameters, from 1 nm to several hundreds of nanometers. The CNT fiber can be collected continuously by sharply shrinking the CNT film with coagulants at the outlet end of the growth chamber, the diameter of which can be 1-200 μm, and the collecting rate of the continuous and self-supported fiber can be slightly higher than that of the continuous and self-supported CNT film, generally 50-600 m/h.

The transmittance and conductivity of the ultrathin CNT film are adjustable, and as the thickness of the film increases, the transmittance (for wavelength of 550 nm) of the film changes from transparent (the transmittance is larger than 95%) to translucent even opaque, while the surface resistance of the film changes from over 1000 Ω/sq to 100 Ω/sq, even less than 10 Ω/sq. The ultrathin CNT film can be both transparent and conductive based on the combined regulation of its transmittance and surface resistance, for example, the transmittance (for wavelength of 550 nm) and the surface resistance can be adjusted to about 75%/80 Ω/sq, 80%/100 Ω/sq, 85%/140 Ω/sq, 88%/160 Ω/sq, 90%/240 Ω/sq, or 93%/400 Ω/sq, which can meet the requirements of touch screen and is expected to replace ITO film and to be used in flexible transparent electronics research and device fabrication.

BRIEF DESCRIPTION OF DRAWINGS

The present invention will be further explained in combination with the embodiments with reference to the accompanying figures, wherein.

DESCRIPTION OF EMBODIMENTS

Figure 1:
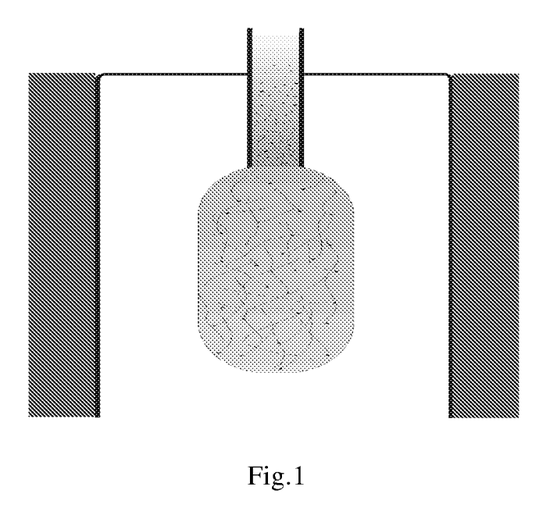
FIG. 1 is a schematic diagram of a "bubble blowing" process according to the method of the present invention.

The present invention provides a method for preparing a CNT film using a process similar to "bubble blowing", which is shown in FIG. 1. CNTs overlapped and tangled with each other during their growth have a certain mechanical tensile strength similar to the tensile stress of a film, which is sufficient to overcome the impact of a mixed gas stream and blow a film with a complete bubble. Therefore, expansive and cannular CNT film bubbles can be formed by controlling the flow rate of the mixed gas stream and other factors.

Figure 2:
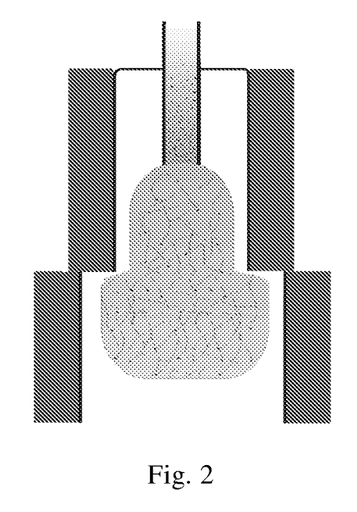
FIG. 2 is a schematic diagram of a multi-level "bubble blowing" process according to the method of the present invention.

Further, a multi-level "bubble blowing" process can be employed, which is shown in FIG. 2, and a CNT film can be expanded step by step with the blowing of mixed gas stream.

The present invention will be described in even greater detail below based on specific embodiments for making the purpose, technical scheme and advantages of the present invention more clear. It should be understood that the specific embodiments are only used to explain the present invention, with no intention to limit the present invention.

Embodiment 1

Figure 3:
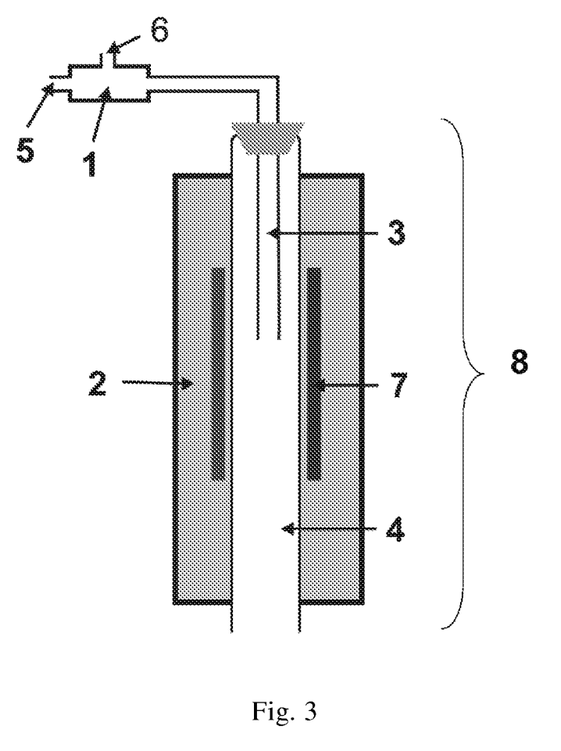
FIG. 3 is a schematic diagram of a preparation apparatus employed in the method of embodiment 1.

A method for preparing a CNT film is provided according to an embodiment of the present invention, and the structure of the preparation apparatus which the method employs is shown in FIG. 3, comprising:

a mixing chamber 1, which can be heated, and have a first inlet 5 for introducing a carrier gas and a carbon source and a second inlet 6 for adding precursors, such as catalyzers and promoters;

a growth chamber 8, comprising a first tubular growth cavity 3 with a diameter of 10 mm and a second tubular growth cavity 4 with a diameter of 30 mm, wherein, the first growth cavity 3 has a first open end in fluid communication with the mixing chamber 1 and a second open end extending into the second growth cavity 4, one end of the second growth cavity 4 is connected to the first growth cavity 3, and the other end (outlet end) remains open and is exposed to the atmosphere; the growth chamber 8 further comprises a heating device 2 surrounding the external side of the second growth cavity 4 for heating the inside of the second growth cavity 4 and the inside of the first growth cavity 3, so that the second growth cavity 4 has a thermostatic area 7 (denoted by the harsh line of FIG. 3), and the second end of the first growth cavity 3 opens at this thermostatic area 7.

According to an embodiment of the present invention, the method for preparing a CNT film with the apparatus above comprises:

1) taking 1 g of ferrocene as catalyzer and 0.003 g of sulfur as promoter, grinding them and mixing together well, and then adding into the mixing chamber 1 through the second inlet 6;

2) raising the temperatures of the mixing chamber 1 and the growth chamber 8 up to 100° C. and 1150° C., respectively;

3) inputting gas mixture of 20 sccm of methane (as a carbon source) and 600 sccm of argon (as a carrier gas) into the mixing chamber 1 through the first inlet 5, making the carrier gas and the carbon source pass through the first growth cavity 3 and the second growth cavity 4 in sequence, and finally exit from the growth chamber through the outlet end of the second growth cavity 4, so as to form a closed cylindrical CNT film partially disposed in the first growth cavity 3;

4) collecting continuous CNT films at the outlet end of the second growth cavity 4.

In general, in the method of the present embodiment, the carrier gas and carbon source enter into the mixing chamber 1 in the form of gases and pass through the first growth cavity 3 and the second growth cavity 4 successively and finally exit from the apparatus through the open end of the second growth cavity 4 by raising the temperature of the mixing chamber 1 to a temperature at which precursors, such as catalyzers and promoters, can be sublimated (100° C. in this embodiment and may be any other temperatures which enable the precursors to sublimate in other embodiments) and raising the temperature of the first growth cavity 3 and the second growth cavity 4 to the growth temperature of a CNT (1150° C. in this embodiment, and may be any other temperatures suitable for the growth of a CNT in other embodiments).

Figure 4:
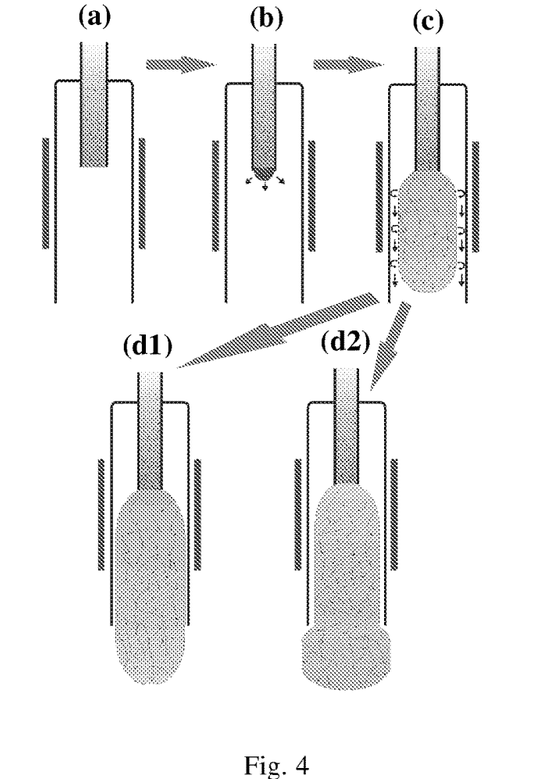
FIG. 4 shows the formation process of a CNT film.

The growth process of a CNT film is shown in FIG. 4a-4d. The process of preparing a CNT film with said method is similar to the process of "bubble blowing", wherein, precursors, such as carbon source, catalyzer and promoter, and carrier gas, are mixed well in the mixing chamber 1 and then enter into the first growth cavity 3 in gaseous form. As shown in FIG. 4(a), the catalyzer and the promoter interact with each other in the first stage of the first growth cavity 3 to form particles which can catalyze the growth of CNTs, and in the second stage of the first growth cavity 3, a carbon source are to be pyrolyzed at a high temperature, and catalytic particles sorb carbon atoms so as to generate CNTs, which are overlapped and tangled to each other to form a "diaphragm" structure at the open end of the first growth cavity 3 extending into the second growth cavity 4, namely at the position of an opening of the first growth cavity 3 within the second growth cavity 4; the "diaphragm" become thicker gradually with the continuous growth of CNTs, and the carrier gas blows the "diaphragm" of CNTs into a bubble, which is a first-level "bubble blowing" process at the open end of the first growth cavity 3, as shown in FIG. 4(*b*); subsequently, a small bubble formed from CNTs becomes a larger cylindrical bubble which is connected to the open end of the first growth cavity 3 at one end and closed at the other end, due to a combined action of the constraint effect of the second growth cavity 4 and the transmission effect of the carrier gas between the inside and outside of the "diaphragm". Under the high temperature of the second growth cavity 4, catalytic particles continue to sorb carbon atoms, and an individual CNT gets longer; meanwhile, the macroscopic cannular CNT film gets wider and thinner due to the carrier gas blowing, as shown in FIG. 4(*c*); the flow of the carrier gas is controlled so as to form a steady gas stream in the whole growth chamber, in particular to make the gas stream between the macroscopic cannular CNT film and the second growth cavity 4 remain steady and prevent the macroscopic cannular CNT film to attach to the inner wall of the second growth cavity 4; and finally, the macroscopic cannular CNT film floats out of the outlet end of the second growth cavity 4 with the carrier gas. The grown film may not contract and be kept at a specified width by controlling the flow of the carrier gas and thus controlling the diameter of the cannular CNT film floated out of the outlet end of the second growth cavity 4, as shown in FIG. 4 (d1). The width of the film can also be increased by increasing the flow of the carrier gas to make the film exceed the diameter of the second growth cavity 4, as shown in FIG. 4 (d2).

Figure 5:
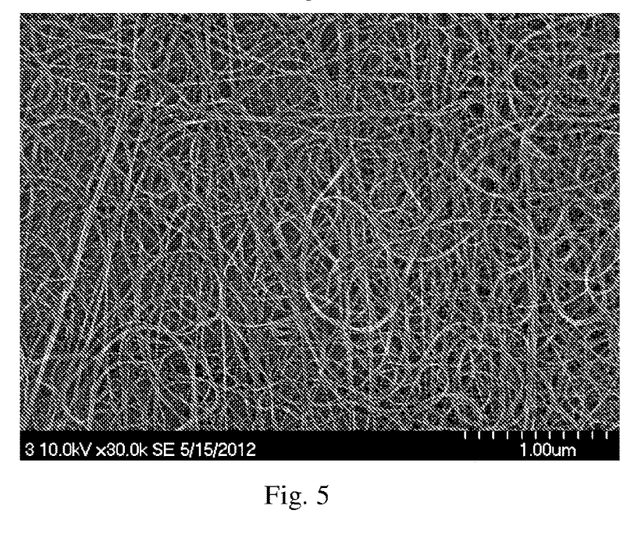
FIG. 5 is the SEM image of the CNT obtained in embodiment 1 of the present invention.
Figure 6:
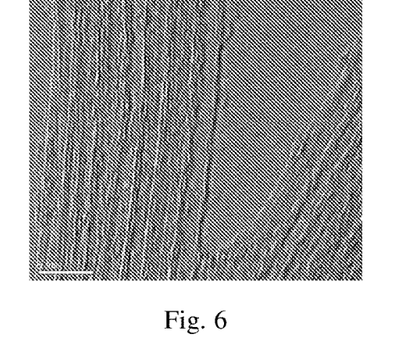
FIG. 6 is the HRTEM image of the CNT obtained in embodiment 1 of the present invention.

FIG. 5 shows a scanning electron microscope (SEM) image of a continuous, ultrathin and self-supported single-walled CNT film prepared with the above method, and it can be seen that there are a few catalytic particles, almost no impurities, in the sample. FIG. 6 is a high-resolution transmission electron microscope (HRTEM) image of the CNT film, and it can be seen that there are single-walled CNTs at the edge of a CNT bundle, with high purity, good crystallinity, clear surfaces and nearly no amorphous carbon.

In the method provided in this embodiment, the gaseous precursor carried by the carrier gas passes through the first growth cavity with a small radial dimension and the second growth cavity with a larger radial dimension successively, and conducts "bubble blowing" process at the position of the opening of the first growth cavity within the second growth cavity, generating directly an uniform and transparent, ultrathin and self-supported, continuous cannular CNT film, and the present invention has the following advantages: the structure of the apparatus employed is simple and the opening can be arranged at the atmosphere with no need to be sealed, being beneficial to the collection of CNT films.

According to apparatuses provided in other embodiments, the first growth cavity 3 and the second growth cavity 4 may be uniformly tube-shaped such as circular tube, square tube, prismatic tube, and the like; the diameter of the second growth cavity is preferably 2-10 times of the diameter of the first growth cavity, for example, the diameter of the first growth cavity is preferably 10-30 mm and that of the second growth cavity is preferably at least 30 mm.

Apparatuses provided in other embodiments further include more growth cavities, for example, three levels of tubular growth cavities with different diameters to realize two levels of "bubble blowing" process, and four or more levels of tubular growth cavities to realize multiple levels of "bubble blowing" process. Diameter of the "bubble" formed from a CNT film is gradually enlarged through multiple levels of growth cavities, so as to make the thickness of the CNT film to decrease gradually, wherein, the diameter of the largest-diameter growth cavity is preferably 2-5 times of that of the smallest-diameter growth cavity.

According to apparatuses provided in other embodiments, the shape of all levels of growth cavities is not limited to be uniformly tubular, for example, it may be conical tube, square-tapered tube, prismatic-tapered tube, stepped tube, and the like. The average sizes of all levels of growth cavities in the flowing direction of the carrier gas increase in sequence so that the radial dimension of the "bubble" formed from the grown CNT film increases successively with the CNT film becoming thinner gradually.

The radial dimension of each level of growth cavities in the flowing direction of the carrier gas may decrease gradually, rather than increasing gradually. For example, for the first growth cavity in the above embodiment, namely the first-level growth cavity, its radial dimension can increase gradually in the flowing direction of the carrier gas (such as a gradually expanded taper), but also can gradually decrease in the same direction (such as a gradually contracted taper). It nearly has no influence on the thickness of the CNT film whether an opening of the first-level growth cavity decreases or increases gradually.

The radial dimension of the succeeding level of growth cavity should be larger than that of the former level of growth cavity if hoping the CNT film be gradually expanded through all levels of growth cavities along the flowing direction of the gas stream. The radial dimension of the succeeding level growth cavity can also be smaller than that of the former level growth cavity if hoping the CNT film be gradually contracted along the flowing direction of the gas stream. Moreover, the changes of the radial dimensions of all levels of growth cavities are not limited to be tapered or stepped, and it can be simple and irregular contraction and expansion.

In the method provided in this embodiment, the radial dimension of the first-level growth cavity is smaller than that of the second-level growth cavity at the junction of the first-level growth cavity and the second-level growth cavity, so that the precursor materials can produce "bubble blowing" process driven by the carrier gas at the position of the opening of the first-level growth cavity within the second-level growth cavity, thus forming a closed cylindrical CNT film partially disposed in the first-level growth cavity. The cylindrical CNT film can grow along the second-level growth cavity and the subsequent third-level to Nth-level (if any) growth cavities, and person skilled in the art can readily select the radial dimensions of the second-level growth cavity and the subsequent third-level to Nth-level growth cavities based on the required parameters such as thickness and width of the CNT film.

Figure 7:
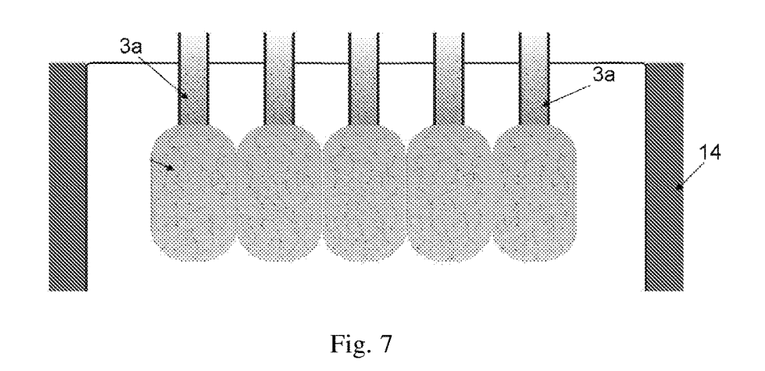
FIG. 7 is a schematic diagram of the apparatus employed in the multiple tubes "bubble blowing" process.

According to apparatuses provided in other embodiments, it can also employ "bubble blowing" process with multiple tubes, and the growing apparatus employed is shown in FIG. 7, wherein, the first growth cavity 3 comprises multiple tubular growth sub-cavities 3*a*, for example, each growth sub-cavity 3*a* has a diameter of 10 mm, and all the growth sub-cavities 3*a* are arranged discretely, for example being spaced to each other for 20 mm, so as to form an arrayed growth cavity. Multiple growth sub-cavities 3a are all opened within the same second growth cavity 14, and the cylindrical nanotube films Cf produced by each growth sub-cavity 3a are adjacent to each other and finally obtain a CNT film wider at the open end of the second growth cavity 14. On the other hand, the cylindrical CNT films produced by each growth sub-cavity 3a can also be not adjacent to each other and finally obtain multiple discrete CNT films at the open end of the second growth cavity 14.

According to apparatuses provided in other embodiments, the additional carrier gas can be charged into the second growth cavity 4 through the first open end, so as to form a gas stream between the cylindrical CNT film and the inner wall of the second growth cavity 4, preventing the CNT film from adhering to the inner wall of the second growth cavity 4. For example, in addition to the first tubular growth cavity 3, there is an outer tube being coaxial with the first tubular growth cavity 3, and the diameter of the outer tube is larger than that of the first growth cavity 3, so as to form a cylindrical gap between the inner wall of the outer tube and the outer wall of the first growth cavity 3, which is used to charge the additional carrier gas into the second growth cavity 4, so as to form a gas stream between the cylindrical CNT film and the inner wall of the second growth cavity 4.

Embodiment 2

Figure 8:
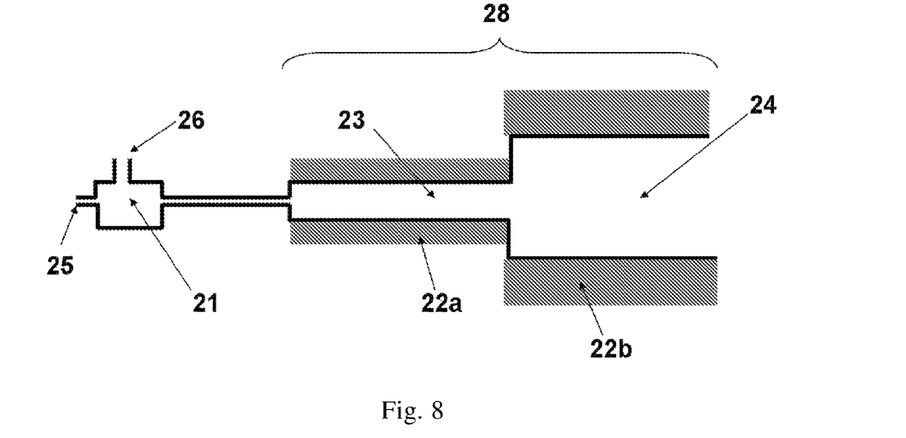
FIG. 8 is a schematic diagram of the preparation apparatus employed in the method of embodiment 2.

A method for preparing a CNT film is provided according to an embodiment of the present invention and the structure of a preparation apparatus which the method employs is shown in FIG. 8, comprising:

A mixing chamber 21 which can be heated, having a first inlet 25 for introducing a carrier gas and a carbon source and a second inlet 26 for adding precursors, such as catalyzers and promoters;

A growth chamber 28, comprising a first tubular growth cavity 23 with a diameter of 30 mm and a second tubular growth cavity 24 with a diameter of 90 mm, wherein one end of the first growth cavity 23 is in fluid communication with the mixing chamber 21, and the other end is in fluid communication to the second growth cavity 24. The end of the second growth cavity 24 not connected to the first growth cavity 23 (the outlet end) remains open and is exposed to the atmosphere;

A heating device 22a surrounding the external side of the first growth cavity 23 and a heating device 22b surrounding the external side of the second growth cavity 24, for heating the inside of the first growth cavity 23 and the inside of the second growth cavity 24, respectively.

A preparation method of a CNT film provided in this embodiment comprises:

1) taking 1 g of ferrocene as catalyzer and 0.005 g of sulfur as promoter, grinding them and mixing together well, and then adding into the mixing chamber 21 through the second inlet 26;

2) raising the temperature of the mixing chamber 21 to 150° C., and raising the temperatures of the first growth cavity 23 and the second growth cavity 24 to 1000° C. and 1100° C., respectively;

3) inputting gas mixture of 1 sccm of ethanol (as a carbon source) and 600 sccm of argon (as a carrier gas) into the mixing chamber 21 through the first inlet 25, making the carrier gas and the carbon source pass through the first growth cavity 23 and the second growth cavity 24 in sequence, and finally exit from the growth chamber through the outlet end of the second growth cavity 24, so as to form a closed cylindrical CNT film partially disposed in the first growth cavity 23;

4) collecting continuous CNT films at the outlet end of the second growth cavity 24.

In general, in the method of the present embodiment, the carrier gas and carbon source enter into the mixing chamber 21 in the form of gases and pass through the first growth cavity 23 and the second growth cavity 24 successively and finally exit from the apparatus through the outlet end of the second growth cavity 24 by raising the temperature of the mixing chamber 21 to a temperature at which precursors, such as catalyzers and promoters, can be sublimated (150° C. in this embodiment and may be any other temperatures which enable the precursors to sublimate in other embodiments) and raising the temperatures of the first growth cavity 23 and the second growth cavity 24 to the growth temperature of a CNT (1000° C. and 1150° C. respectively in this embodiment and may be any other temperatures suitable for the growth of a CNT in other embodiments). The catalyzer and the promoter are interacted with each other in the first stage of the first growth cavity 23 to form particles which can catalyze the growth of a CNT, and in the second stage of the first growth cavity 23, a carbon source begins to be pyrolyzed at a high temperature, and catalytic particles sorb carbon atoms so as to generate CNTs, which are overlapped and tangled to each other to form a "diaphragm" structure at the open end of the first growth cavity 23; the "diaphragm" becomes thicker gradually with the continuous growth of CNTs, and the carrier gas blows the "diaphragm" of CNTs into a bubble, which is a first-level "bubble blowing" process at the open end of the growth cavity 23; subsequently, a small bubble formed from CNTs becomes a larger cylindrical bubble which is connected to the open end of the first growth cavity 23 at one end and closed at the other end, due to a combined action of the constraint effect of the second growth cavity 24 and the transmission effect of the carrier gas between the inside and outside of the "diaphragm". Under the high temperature of the second growth cavity 24, catalytic particles continue to sorb carbon atoms, and an individual CNT gets longer, meanwhile, the macroscopic cannular CNT film gets wider and thinner due to the carrier gas; the flow of the carrier gas is controlled so as to form a steady gas stream in the whole growth chamber, in particular to make the gas stream between the macroscopic cannular CNT film and the second growth cavity remain steady and prevent the macroscopic cannular CNT film to attach to the inner wall of the second growth cavity; and finally, the macroscopic cannular CNT film floats out of the outlet end of the second growth cavity 24 with the carrier gas. The grown film may be made equal to or exceed the diameter of the second growth cavity 24 by controlling the flow of the carrier gas and thus controlling the width of the film.

Figure 9:
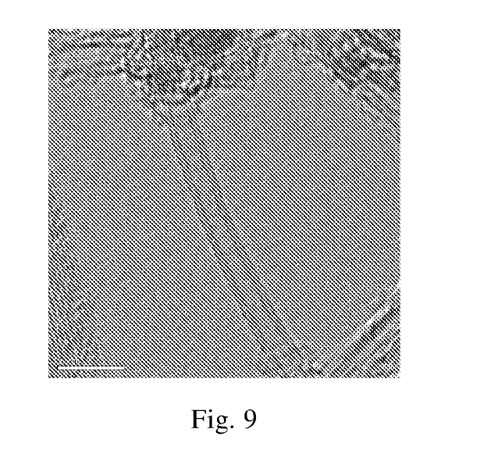
FIG. 9 is the HRTEM image of the CNT obtained in embodiment 2 of the present invention.

A continuous, ultrathin and self-supported double-walled CNT film is prepared with the above method, and its high-resolution transmission electron microscope (HRTEM) image is shown in FIG. 9, in which it can be seen that there are almost no impurities in the sample except for a few catalytic particles, and the CNT film is formed of an individual double-walled CNTs or a double-walled CNT bundle, and the CNTs have high purity, good crystallinity and clear surfaces, nearly having no amorphous carbon.

In the method provided in this embodiment, the gaseous precursor carried by the carrier gas passes through the first growth cavity with a small radial dimension and the second growth cavity with a large radial dimension in sequence, and conducts a "bubble blowing" process at a junction of the first growth cavity and the second growth cavity, namely a position of the opening of the first growth cavity within the second growth cavity, generating directly an uniform and transparent, ultrathin and self-supported, continuous cannular CNT film, and the present invention has the following advantages: the structure of the apparatus employed is simple, and the opening can be arranged at the atmosphere with no need to be sealed, being beneficial to the collection of CNT films.

According to apparatuses provided in other embodiments, the first growth cavity and the second growth cavity are not limited to be tubular, for example, they may be a tapered tube, and diameters of the first growth cavity and the second growth cavity increase gradually in the flowing direction of the carrier gas, so that the diameter of the "bubble" formed from the CNT film increases gradually with the CNT film becoming thinner gradually. According to apparatuses provided in other embodiments, the diameter of the second growth cavity is preferably 2-4 times of the diameter of the first growth cavity, for example, the diameter of the first growth cavity is preferably 10-30 mm and that of the second growth cavity is preferably 30-90 mm.

Apparatuses provided in other embodiments may further include a third growth cavity which has a radial dimension larger than that of the second growth cavity, located at the downstream of the second growth cavity in the flowing direction of the carrier gas to realize two levels of "bubble blowing" process. It may further comprise more growth cavities in order to realize multiple levels of "bubble blowing" processes. Thus, the diameter of the "bubble" formed from a CNT film gradually increases, making the thickness of the CNT film decrease gradually, wherein, the diameter of the largest-diameter growth cavity is preferably 3-10 times of that of the smallest-diameter growth cavity.

According to apparatuses provided in other embodiments, the shape of all levels of growth cavities is not limited to be uniformly tubular, for example, it can further be a tapered tube, such as conical tube, square-tapered tube, prismatic-tapered tube. The average sizes of all levels of growth cavities in the flowing direction of a carrier gas increase successively so that the diameter of the "bubble" formed from the CNT film increases successively, making the CNT film get thinner gradually.

The radial dimension of each level of growth cavity in the flowing direction of the carrier gas may decrease gradually, rather than increasing gradually. For example, for the first growth cavity in the above embodiment, namely the first-level growth cavity, its radial dimension can increase gradually in the flowing direction of the carrier gas (such as a taper gradually expanded), but also can gradually decrease in the same direction (such as a taper gradually contracted). It nearly has no influence on the thickness of a CNT film whether an opening of the first-level growth cavity decreases or increases.

The radial dimension of the succeeding level growth cavity should be larger than that of the former level growth cavity if hoping the CNT film be gradually expanded through all levels of growth cavities along the flowing direction of a gas stream. The radial dimension of the succeeding level growth cavity can also be smaller than that of the former level growth cavity if hoping the CNT film be gradually contracted along the flowing direction of a gas stream. Moreover, the changes of the radial dimensions of all levels of growth cavities are not limited to be tapered or stepped, and it can be simple and irregular contraction and expansion.

In the method provided in this embodiment, the radial dimension of the first-level growth cavity is smaller than that of the second-level growth cavity at the junction of the first-level growth cavity and the second-level growth cavity, so that the precursor materials can produce "bubble blowing" process driven by the carrier gas at the position of the opening of the first-level growth cavity within the second-level growth cavity, thus forming a closed cylindrical CNT film partially disposed in the first-level growth cavity. The cylindrical CNT film can grow along the second-level growth cavity and the subsequent third-level to Nth-level (if any) growth cavities, and person skilled in the art can readily select the radial dimensions of the second-level growth cavity and the subsequent third-level to Nth-level growth cavities based on the required parameters such as thickness and width of the CNT film.

Embodiment 3

Figure 10:
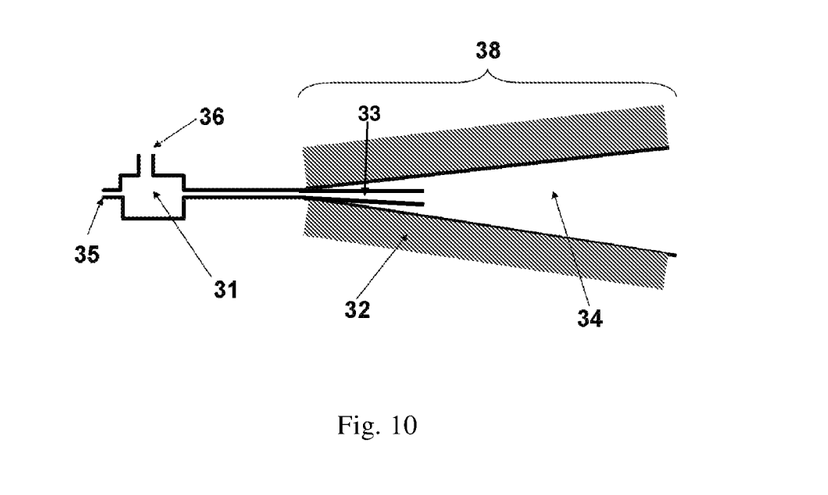
FIG. 10 is a schematic diagram of the preparation apparatus employed in the method of embodiment 3.

A preparation apparatus of a CNT film is provided according to an embodiment of the present invention, and its structure is shown in FIG. 10, comprising:

A mixing chamber 31 which can be heated, having a first inlet 35 for introducing a carrier gas and a carbon source and a second inlet 36 for adding precursors, such as catalyzers and promoters;

A growth chamber 38, comprising a first tapered tubular growth cavity 33 and a second tapered tubular growth cavity 34, wherein, the first growth cavity 33 and the second growth cavity 34 have a first open end with a relatively narrow diameter and a second open end with a relatively wide diameter, the first open end of the first growth cavity 33 is in fluid communication with the mixing chamber 31, and the second open end extends into the second growth cavity 34 through the first open end with a relatively narrow diameter of the second growth cavity 34, the second open end with a relatively wide diameter (the outlet end) of the second growth cavity 34 remains open and is exposed to the atmosphere;

A heating device 32 surrounding the external side of the second growth cavity 34, for heating the first growth cavity 33 and the inside of the second growth cavity 34.

A preparation method of a CNT film provided in this embodiment comprises:

1) taking 1.5 g of ferrocene as catalyzer and 0.01 g of sulfur as promoter, grinding them and mixing together well and then adding into the mixing chamber 31 through the second inlet 36;

2) raising the temperatures of the mixing chamber 31 and the growth chamber 38 to 120° C. and 1060° C., respectively;

3) inputting gas mixture of 30 sccm of methane (as a carbon source) and 600 sccm of argon (as a carrier gas) into the mixing chamber 31 through the first inlet 35, making the carrier gas and the carbon source pass through the first growth cavity 33 and the second growth cavity 34 in sequence, so as to form a closed cylindrical CNT film partially disposed in with the first growth cavity 33;

4) collecting continuous CNT films at the outlet end of the second growth cavity 34.

Figure 11:
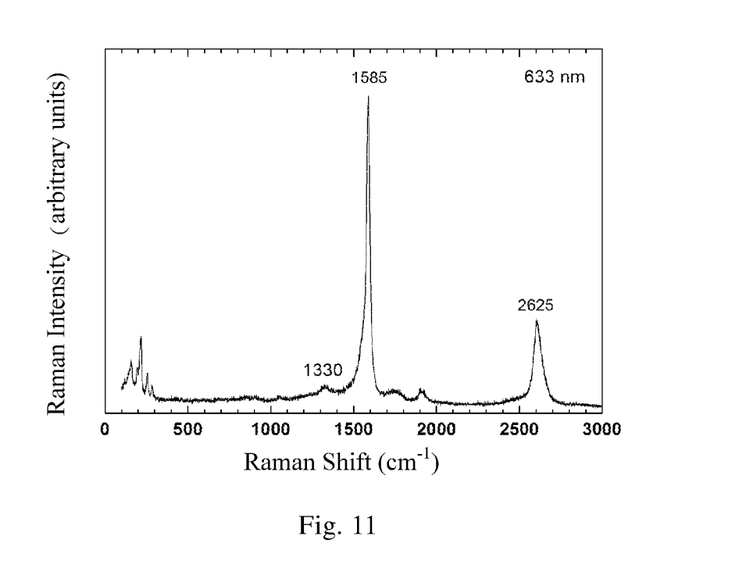
FIG. 11 is the Raman scattering spectrum of the CNT obtained according to the method of embodiment 3 of the present invention.

A continuous, ultrathin and self-supported single- and double-walled hybrid CNT film is prepared with the above method, with almost no impurities in the sample except for a few catalytic particles. And the CNTs have high purity, good crystallinity and clear surfaces, nearly having no amorphous carbon. The Raman scattering spectrum of the continuous, ultrathin and self-supported CNT film is shown in FIG. 11, with the exciting light wavelength of 633 nm, and the intensity ratio of G band and D band manifests that the CNT film of the sample has little defects, the degree of graphitization is high and the crystallinity is great.

In the method provided by the present embodiment, the carrier gas and carbon source enter into the mixing chamber 31 in the form of gases and pass through the first growth cavity 33 and the second growth cavity 34 successively and finally exit from the apparatus through the second open end of the second growth cavity 34 by raising the temperature of the mixing chamber 31 to a temperature at which precursors, such as catalyzers and promoters, can be sublimated (120° C. in this embodiment and may be any other temperatures which enable the precursors to sublimate in other embodiments) and raising the temperature of the growth cavity 34 to the growth temperature of a CNT (1060° C. in this embodiment and may be any other temperatures suitable for the growth of a CNT in other embodiments).

In this embodiment, the catalyzer and the promoter are interacted with each other in the first stage of the first growth cavity 33 to form particles which can catalyze the growth of a CNT, and in the second stage of the first growth cavity 33, especially at the position of the open end of the first growth cavity 33 extending into the second growth cavity 34, i.e., the position of an opening of the first growth cavity 33 within the second growth cavity 34, a carbon source begins to be pyrolyzed at a high temperature, and catalytic particles sorb carbon atoms so as to generate CNTs that are overlapped and tangled to each other to form a "diaphragm" structure; the "diaphragm" becomes thicker gradually with the continuous growth of CNTs, and the carrier gas blows the "diaphragm" of CNTs into a bubble; subsequently, a small bubble formed from CNTs becomes a larger tapered tubular bubble due to the combined action of the constraint effect of the growth cavity and the transmission effect of the carrier gas between the inside and outside the "diaphragm". Under the high temperature of the growth cavity, catalytic particles proceed to sorb carbon atoms, and an individual CNT gets longer, meanwhile, the macroscopic tapered tubular CNT bubble gets wider and thinner due to the carrier gas; the flow of the carrier gas is controlled so as to form a steady gas stream in the whole growth chamber, in particular to make the gas stream between the macroscopic cannular CNT film and the growth cavity remain steady and prevent the macroscopic cannular CNT film to attach to the inner wall of the growth chamber; and finally, the macroscopic CNT film floats out of the second open end of the growth cavity with the carrier gas. The grown film may be made to be equal to or exceed the diameter of the second open end of the growth cavity by controlling the flow of the carrier gas and thus controlling the width of the film.

The apparatus provided in this embodiment can make the gaseous precursor carried by the carrier gas pass through the first tapered tubular growth cavity and conduct a "bubble blowing" process, so as to directly produce an uniform and transparent, ultrathin and self-supported, continuous CNT film. In addition, the present invention has the following advantages: simple structure, the opening being arranged at the atmosphere with no need to be sealed, being beneficial to the collection of CNT films.

Embodiment 4

A preparation method of a CNT film for use with the apparatus of embodiment 2 is provided in this embodiment, comprising:

1) taking 1 g of ferrocene as catalyzer and 0.01 g of sulfur as promoter, grinding and mixing together well, and then adding into the mixing chamber 21 through the second inlet 26;

2) raising the temperature of the mixing chamber 21 to 180° C., and raising the temperatures of the first growth cavity 23 and the second growth cavity 24 to 750° C. and 900° C., respectively;

3) inputting gas mixture of 15 sccm of ethyne (as a carbon source) and 500 sccm of nitrogen (as a carrier gas) into the mixing chamber 21 through the first inlet 25, making the carrier gas and the carbon source pass through the first growth cavity 23 and the second growth cavity 24 in sequence, and finally exit from the growth chamber through the outlet end of the second growth cavity 24, so as to form a closed cylindrical CNT film partially disposed in with the first growth cavity 23;

4) collecting continuous CNT films at the outlet end of the second growth cavity 24.

Figure 12:
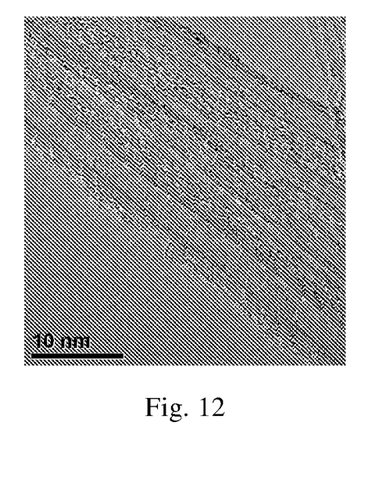
FIG. 12 is the HRTEM image of the CNT obtained according to the method of embodiment 4 of the present invention.

A continuous, ultrathin and self-supported multi-walled CNT film is prepared with the above method, and its HRTEM image is shown in FIG. 12, in which it can be seen that there are almost no impurities in the sample except for a few catalytic particles, and the CNT film is formed of an individual multi-walled CNT or a multi-walled CNT bundle, and the CNTs have high purity, good crystallinity and clear surfaces, nearly having no amorphous carbon.

Embodiment 5

A preparation method of a CNT film for use with the apparatus of embodiment 1 is provided in this embodiment, comprising:

1) taking 0.8 g of ferrocene as catalyzer and 0.01 g of sublimed sulfur as promoter and dispersing them into 100 ml of ethanol (as a carbon source) and stirring well;

2) raising the temperature of the growth chamber 8 to 1120° C.;

3) pumping directly the alcohol dispersion liquid of catalyzer and promoter, obtained from step 1), into the first growth cavity 3 by a peristaltic pump at a rate of 0.1 ml/min;

4) inputting 600 sccm of argon into the mixing chamber 1 through the first inlet end 5 as a carrier gas, which carries carbon source, catalyzer and promoter to pass through the first growth cavity 3 and the second growth cavity 4 in sequence, so as to form a closed cylindrical CNT film partially disposed in the first growth cavity 3;

5) at the second open end of the growth cavity 4, immersing the CNT film floating out of the second open end in a coagulant comprised of water, making it shrink sharply to form a CNT fiber, and collecting the CNT fiber continuously through a spindle driven by a motor.

A continuous and self-supported CNT fiber is prepared with the above method, wherein, the diameter of the fiber in this embodiment is about 30 μm. The coagulant may be alcohol, acetone or other solvents. The collecting rate of the continuous and self-supported fiber may be slightly higher than that of the continuous and self-supported CNT film, generally being 50-600 m/h.

In the preparation methods of the embodiments 1-4 above, the precursor comprised of catalyzer and promoter is mixed well and put into the mixing chamber, and then heated to a temperature which can sublimate it, flowing into the first growth cavity driven by the gas mixture of gaseous carbon source (such as ethyne and methane) and carrier gas, and at the temperature the CNTs being suitable to grow in the first growth cavity, the precursors, such as carbon source, catalyzer and promoter, are reacted to generate CNTs. However, the methods of the present invention are not limited to the above method for supplying precursors. For example, like the embodiment 5, the solid catalyzer and promoter are dispersed in the liquid carbon source, and the dispersion liquid is directly pumped into the first growth cavity, and at the temperature the CNTs being suitable for the growth in the first growth cavity, the liquid carbon source, the solid catalyzer and promoter are reacted to generate CNTs, and then to form bubble-shaped CNT driven by the carrier gas. In fact, the methods of the present invention can employ any precursor materials (comprising catalyzer, carbon source, promoter, and the like) that CVD method employs to produce CNTs, and these precursors can also be any one of gas, liquid and solid or the mixture of any ones of them, on condition that the placement way or feeding way of these precursors can enable them to react and produce CNTs at the temperature CNTs being suitable for growth in the first growth cavity, and it is irrelevant to the phase and the feeding way of the precursor materials. People skilled in the art can flexibly select a feeding way for the precursors according to their needs, for example, for a horizontal growth cavity, the solid catalyzer, promoter and carbon source may be mixed and directly placed in the reaction boat located in the first growth cavity, and the CNTs generated at the high temperature in the first reaction chamber form a closed cylindrical CNT film partially disposed in the first reaction chamber due to the carrier gas. It is a common technical means in the art to produce CNTs with CVD method, and it is well known also in the art for selecting various precursor materials and the ratios among these precursor materials in this method. The precursor materials employed in the CVD method producing CNTs may all be used as the precursor materials of the present invention.

According to the preparation method provided in any one embodiment of the present invention, the growth cavity can be made of quartz, alumina, ceramics, and the other materials and the growth chamber of CNTs can be placed in any directions, for example, horizontally, aslant, and vertically; in addition, preferably, the opening of the growth chamber can be directly positioned at the atmosphere without being sealed, being beneficial to the continuous collection of the CNT film.

According to the preparation methods provided in the other embodiments, in addition to methane and alcohol above, the carbon source can further be one or more of other carbon sources used in catalytic pyrolysis method, CVD method or the like, which can produce CNTs, such as gas phase source (such as methane, ethyne, ethene, natural gas and gas mixture thereof), liquid phase source (such as alcohol, acetone, glycol, methylbenzene, hexane and liquid mixture thereof), or gas-liquid mixing source (such as methane+alcohol, methane+acetone and ethyne+alcohol), or solid phase source (such as ferrocene and nickelocene), or being assisted with water, and so on.

According to the preparation methods provided in the other embodiments, the catalyzer can be that used in the catalytic pyrolysis method which can produce CNTs, including iron-based, cobalt-based or nickel-based compounds being easily sublimated or decomposed, or their mixture, such as ferrocene, nickelocene, cobaltocene, iron(III) acetylacetonate, iron carbonyl, nickel acetate, and cobalt acetate.

According to the preparation methods provided in the other embodiments, the promoter can be that used in the catalytic pyrolysis method which can produce CNTs, including compounds being easily sublimated or decomposed and their mixture, such as sulphur, thiophene, carbon disulfide, sulphur+thiophene, and the like.

According to the preparation methods provided in the other embodiments, the carrier gas is inert gas, or gas mixture of reducing gas and inert gas, such as nitrogen, argon, helium, and hydrogen/argon (the volume ratio is preferably 1:25-1:1).

According to the preparation methods provided in the other embodiments, the precursors, such as catalyzer and promoter with a proportion suitable for the growth of CNTs, are processed to be gas or liquid by a method such as solution-evaporation method or sublimation method, and mixed well in the mixing chamber, and the continuous supply of the precursors is guaranteed through the feeding inlet of the processing chamber. People skilled in the art can easily select the types and amounts of carrier gases and precursors, such as catalyzer, promoter, and carbon source as required.

According to the preparation methods provided in the other embodiments, various growth cavities are heated up to a temperature suitable for the growth of CNTs, wherein, the temperature suitable for the growth of CNTs is determined according to the carbon source used and the target products required, and in general, for a single-walled CNT 1050-1300° C., for a double-walled CNT 950-1150° C., and for a multi-walled CNT 700-950° C. Moreover, the temperatures in various growth cavities can be different, so that the temperatures of the whole growth chamber present a certain gradient. For each growth cavity, the temperature distribution can be uniform or non-uniform, for example, presenting a certain gradient, and people skilled in the art can easily select the temperatures and the temperature gradients of various growth cavities according to the target products required and the precursors used, and how to control the temperature and the temperature gradient of the growth cavities is well known in the art. In the method provided in the present invention, in order to realize the "bubble blowing" process, it is ensured at least that the temperature of a part of the first-level growth cavity, which is adjacent to the second-level growth cavity, is kept in the temperature suitable for the growth of CNTs, so that the precursors can react in it and generate CNTs, then forming a closed cylindrical CNT film partially disposed in the first growth cavity.

According to the preparation methods provided in the other embodiments, the temperature of the mixing chamber is determined according to the precursor such as catalyzer and promoter, and generally not more than 300° C.

According to the preparation methods provided in the other embodiments, the flowing rate of a gas stream is preferably 100-5000 sccm and specifically determined according to the volume of the growth cavity and the growth rate of the CNT film required. And the carbon source, catalyzer and promoter are carried into the growth chamber by the carrier gas.

According to the preparation methods provided in any one embodiment of the present invention, the continuous CNT film can be collected on a frame prepared in advance or on a particular substrate for observation, and the continuous collection of the CNT film can be conducted through a spindle driven by a motor.

Figure 13:
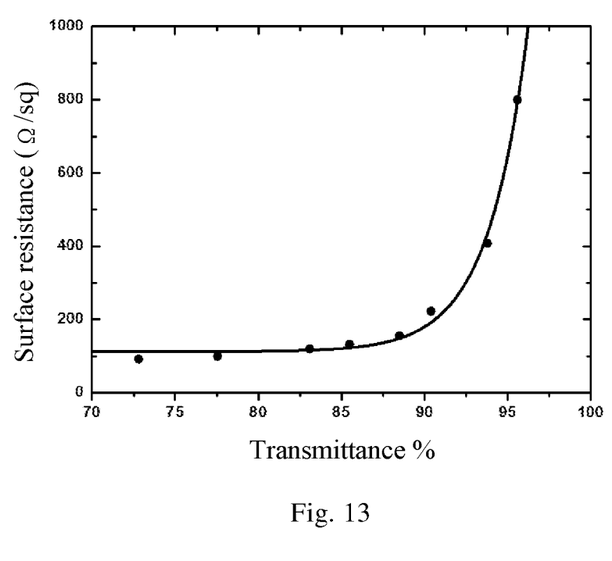
FIG. 13 shows the relationship between transmittance and surface resistance of films with different thicknesses.

In order to illustrate the transparent conductive property of the CNT film prepared according to the method of the present invention, CNT films are prepared with different thicknesses, wherein, the transparency in visible region and the surface resistance at room temperature thereof are measured, and the relation between the transparency (for a wavelength of 550 nm) and the surface resistance is shown in FIG. 13. It can be seen from FIG. 13 that the surface resistance is 156 Ω/sq when the transparency of the obtained film is 88.5% for wavelength of 550 nm, and the experimental result shows that the continuous, ultrathin and self-supported CNT film prepared directly in the present invention is transparent and conductive, which can meet the requirements of touch screen and is expected to replace ITO film and to be used in flexible transparent electronics research and device fabrication.

An ultrathin, self-supported, transparent, conductive and flexible CNT film can be prepared with the apparatus of the present invention, which has a certain orientation and a controllable width and thickness. The film-forming rate is fast, usually 50-500 m/h, which may be determined generally based on the growth rate of the CNT film, the transparency of the film, the flowing rate of the carrier gas, and other parameters. Moreover, people skilled in the art can easily prepare a CNT film formed from single-walled, double-walled or multi-walled CNTs and nanotube bundles with a length of several hundred microns to centimeters and a purity of more than 90 wt. % by controlling the preparation process parameters.

The CNTs and nanotube bundles within the film are in the form of continuous web with two-dimensional disordered distribution, having a good uniformity and a certain orientation along the length, and the porosity of the web is generally 20%-60%; the ultrathin CNT film is self-supported and independent and has no substrate; the mechanical strain strength of the film is up to 350 MPa and the Young's modulus is up to 5 GPa; the thickness of the film is 1 nm at least, that is the thickness of the web of monolayer and single-walled CNTs, and the film is transparent; the length of the film is not limited, which can continuously grow and can be regulated; the growth rate is controllable, up to several hundreds of meters per hour, generally 50-500 m/h; and the width of the film is adjustable in the range of 1 cm-1 m.

The ultrathin CNT film may be adjustable in length and grow continuously and directly with the continuous supply of raw materials, wherein, the growth rate is controllable, generally 50-500 m/h; the ultrathin CNT film is also adjustable in width, which can be regulated according to the actual requirements with the settings of growth process conditions, up to above 1 m; the thickness of the ultrathin CNT film is uniform and adjustable depending on the design of growth parameters, from 1 nm to several hundreds of nanometers. The CNT fiber can be collected continuously by sharply shrinking the CNT film with coagulants at the outlet end of the growth chamber, the diameter of which can be 1-200 μm, and the collecting rate of the continuous and self-supported fiber can be slightly higher than that of the continuous and self-supported CNT film, generally 50-600 m/h.

The transmittance and conductivity of the ultrathin CNT film are adjustable, and as the thickness of the film increases, the transmittance (for wavelength of 550 nm) of the film changes from transparent (the transmittance is larger than 95%) to translucent even opaque, while the surface resistance of the film changes from over 1000 Ω/sq to 100 Ω/sq, even less than 10 Ω/sq. The ultrathin CNT film can be both transparent and conductive based on the combined regulation of its transmittance and surface resistance, for example, the transmittance (for wavelength of 550 nm) and the surface resistance can be adjusted to about 75%/80 Ω/sq, 80%/100 Ω/sq, 85%/140 Ω/sq, 88%/160 Ω/sq, 90%/240 Ω/sq, or 93%/400 Ω/sq, which can meet the requirements of touch screen and is expected to replace ITO film and to be used in flexible transparent electronics research and device fabrication.

As a conclusion, it should be noted that the embodiments above are only intended to illustrate but not to limit the technical scheme of the present invention. Although the present invention has been described in detail according to embodiments above, those skilled in the art should understand that numerous alterations and equivalent replacements without departing from the spirit or scope of this invention are in the scope of the claims.

The invention claimed is:

1. A method for preparing a carbon nanotube (CNT) film, comprising:
   providing a growth chamber of CNTs, wherein the growth chamber includes an inlet end, an outlet end, a first-level growth cavity and a second-level growth cavity, wherein the first-level growth cavity and the second-level growth cavity are in fluid communication between the inlet end and the outlet end;
   reacting carbon sources and catalyzers in at least the first-level growth cavity of the growth chamber of CNTs to generate the CNTs;
   flowing a carrier gas into the growth chamber through the inlet end, the first-level growth cavity and the second-level growth cavity in sequence, wherein a radial dimension of the first-level growth cavity in a flowing direction of the carrier gas is smaller than that of the second-level growth cavity at a junction between the first-level growth cavity and the second-level growth cavity, wherein a bubble blowing process is conducted with the CNTs under a drive of the carrier gas to generate a closed cylindrical CNT film at a position of an opening of the first-level growth cavity within the second-level growth cavity, wherein the closed cylindrical CNT film is connected to the first-level growth cavity; and
   collecting the CNT film continuously at the outlet end of the growth chamber.

2. A method as in claim 1, wherein the first-level growth cavity includes multiple growth cavities, wherein multiple openings of the multiple growth cavities are being placed within the same second-level growth cavity.

3. A method as in claim 1, wherein the growth chamber further comprises third-level to Nth-level growth cavities, wherein N>3, and wherein average radial dimensions of the growth cavities in the flowing direction of the carrier gas increase successively from the first-level growth cavity to the Nth-level growth cavity.

4. A method as in claim 3, wherein the first-level growth cavity to the Nth-level growth cavity are all tubular with different diameters, and the first-level to the Nth-level growth cavities are in fluid communication with each other for forming a step-tubular growth chamber.

5. A method as in claim 3, wherein at least one of the first-level to the Nth-level growth cavities comprises a tapered tube.

6. A method as in claim 1, wherein the first-level growth cavity and the second-level growth cavity comprise tubes with different radial dimensions, and one end of the first-level growth cavity extends into the second-level growth cavity in the flowing direction of the carrier gas, and the carrier gas passes through the first-level growth cavity and at least part of the second-level growth cavity while flowing through the growth chamber.

* * * * *